United States Patent
Chatterjee et al.

(10) Patent No.: US 10,880,120 B2
(45) Date of Patent: Dec. 29, 2020

(54) SYSTEM AND METHODS FOR TUNNELING MEDIA THROUGH SECURE CHANNEL

(71) Applicant: AVAYA INC., Santa Clara, CA (US)

(72) Inventors: Manish Chatterjee, Kharadi (IN); Shobhit Mishra, Magarpatta (IN)

(73) Assignee: Avaya Inc., Santa Clara, CA (US)

( * ) Notice: Subject to any disclaimer, the term of this patent is extended or adjusted under 35 U.S.C. 154(b) by 47 days.

(21) Appl. No.: 16/039,585

(22) Filed: Jul. 19, 2018

(65) Prior Publication Data
US 2020/0028710 A1 Jan. 23, 2020

(51) Int. Cl.
*H04L 12/46* (2006.01)
*H04L 29/06* (2006.01)
*H04L 29/08* (2006.01)

(52) U.S. Cl.
CPC ...... *H04L 12/4633* (2013.01); *H04L 65/1069* (2013.01); *H04L 65/102* (2013.01); *H04L 65/105* (2013.01); *H04L 65/1006* (2013.01); *H04L 67/02* (2013.01)

(58) Field of Classification Search
None
See application file for complete search history.

(56) References Cited

U.S. PATENT DOCUMENTS

| | | |
|---|---|---|
| 7,483,437 B1 | 1/2009 | Mohaban |
| 8,266,299 B2 | 9/2012 | Zetterlund |
| 9,479,967 B1 | 10/2016 | Smith et al. |
| 2002/0122416 A1* | 9/2002 | Xu .......... H04L 29/125 370/352 |
| 2006/0080407 A1 | 4/2006 | Rengaraju et al. |
| 2008/0192108 A1 | 8/2008 | Pelous et al. |
| 2008/0267096 A1* | 10/2008 | Nakamura ........ H04L 65/608 370/261 |
| 2009/0238168 A1 | 9/2009 | Lavoie et al. |
| 2010/0325300 A1 | 12/2010 | Vasters et al. |
| 2012/0120852 A1 | 5/2012 | Morken et al. |

(Continued)

OTHER PUBLICATIONS

Official Action for U.S. Appl. No. 15/335,735, dated Aug. 6, 2018 16 pages.

(Continued)

*Primary Examiner* — Jay L Vogel
(74) *Attorney, Agent, or Firm* — Sheridan Ross P.C.

(57) ABSTRACT

Embodiments of the disclosure provide systems and methods for exchanging media through an edge server between different communication networks. According to one embodiment, an edge element can receive, during initiation of a call session between a calling endpoint on a first communication network and a remote endpoint on a second communication network, a message to the remote endpoint to check media connectivity in the call session. A determination can be made as to whether media connectivity is available between the calling endpoint and the remote endpoint. In response to determining media connectivity is not available between the calling endpoint and the remote endpoint, the call session can be conducted between the calling endpoint and the remote endpoint using tunneling of multiplexed media streams through a selected port of the edge element. Each of the multiplexed media streams are identified by a unique stream identifier.

12 Claims, 6 Drawing Sheets

(56) References Cited

U.S. PATENT DOCUMENTS

| | | | |
|---|---|---|---|
| 2012/0243549 A1 | 9/2012 | Lyons et al. | |
| 2013/0067020 A1* | 3/2013 | German | H04L 67/22 709/213 |
| 2013/0138822 A1* | 5/2013 | Hu | H04L 65/1069 709/227 |
| 2014/0226664 A1* | 8/2014 | Chen | H04L 67/02 370/392 |
| 2015/0188882 A1 | 7/2015 | Wang et al. | |
| 2016/0380967 A1* | 12/2016 | Moore | H04L 65/1069 709/217 |
| 2017/0180484 A1* | 6/2017 | Asveren | H04L 67/141 |
| 2017/0339565 A1* | 11/2017 | Dong | H04L 65/1069 |
| 2018/0054468 A1* | 2/2018 | Whynot | H04L 65/105 |

OTHER PUBLICATIONS

Official Action for U.S. Appl. No. 15/335,735, dated Dec. 26, 2018 17 pages.
Official Action for U.S. Appl. No. 15/335,735, dated May 24, 2019 14 pages.
Official Action for U.S. Appl. No. 15/335,735, dated Nov. 5, 2019 17 pages.
Examiner's Answer for U.S. Appl. No. 15/335,735, dated Jun. 19, 2020 17 pages.

* cited by examiner

SYSTEM AND METHODS FOR TUNNELING MEDIA THROUGH SECURE CHANNEL

FIELD OF THE DISCLOSURE

Embodiments of the present disclosure relate generally to methods and systems for exchanging media across communication networks and more particularly to exchanging media through an edge server between communication networks.

BACKGROUND

Exchanges of audio and/or video media may occur in various types of communication sessions such as voice calls, video calls, voice and/or video conferences, etc. These exchanges can also be made across different types of networks. For example, a voice or video call or conference can be established and conducted on a closed network, such as within a private network of an enterprise, on an open or public network, such as the Internet, or on a combination of these networks, such as when a party to the call or conference is on a private, enterprise network and another party in on the Internet or a different private network. Typically, voice or video calls or conferences on either an open, public network or on a private network can be established and conducted using known protocols such as User Datagram Protocol (UDP) or Web Real Time Communication (WebRTC) protocol without concern about crossing boundaries between the private network and the open network. However, when a call or conference is to be established and conducted across both open and private networks or across different private networks, security policies may be in place on the private network(s) that prohibit certain types of traffic from crossing the boundary between these networks. For example, a Session Initiation Protocol (SIP) or HyperText Transport Protocol (HTTP) client may try to initiate a call or conference with another party on an enterprise network different from the private or public network of the client. Such a call or conference will traverse one or more firewalls of the enterprise. However, the enterprise may implement security policies that prohibit UDP, WebRTC, or other media protocol packets from crossing this firewall causing the call or conference to fail. Hence, there is a need for improved methods and systems for exchanging media through an edge server between communication networks.

BRIEF SUMMARY

Embodiments of the disclosure provide systems and methods for exchanging media through an edge server between different communication networks. More specifically, embodiments of the present disclosure provide systems and methods for establishing and conducting voice and/or video communications between one or more parties on a private network, such as within an enterprise, and one or more parties on a different network such as another private network or an open network such as the Internet using an edge server of the enterprise network. This edge server, also referred to herein as an edge element, such as a Session Border Controller (SBC), can be adapted to allow media packets to traverse through a port typically kept open by enterprise firewalls and used for other data exchanges such as HyperText Transfer Protocol (HTTP) data traffic. The SBC can also provide multiplexing and demultiplexing of media streams through the same port and address to traverse firewalls between the different communication networks.

According to one embodiment, a system can comprise a first communication network a, second communication network, and an edge element coupled with the first communication network and the second communication network. The edge element can comprise a processor and a memory. The memory can comprise a set of instruction stored therein which, when executed by the processor, causes the processor to receive, during initiation of a call session between a calling endpoint on the first communication network and a remote endpoint on the second communication network, a message to the remote endpoint to check media connectivity in the call session. A determination can be made as to whether media connectivity is available between the calling endpoint and the remote endpoint. In response to determining media connectivity is not available between the calling endpoint and the remote endpoint, the call session between the calling endpoint and the remote endpoint can be conducted using tunneling of multiplexed media streams through a selected port of the edge element. Each of the multiplexed media streams can be identified by a unique stream identifier. According to one embodiment, the unique stream identifier can be derived from a certificate installed on the calling endpoint.

Conducting the call session between the calling endpoint and the remote endpoint using tunneling of the multiplexed media streams through the selected port of the edge element can comprise receiving a media tunneling offer from the calling endpoint. The media tunneling offer can include the unique stream identifier for the media streams to be exchanged with the calling endpoint. A media tunneling answer can be generated and sent to the calling endpoint in response to the media tunneling offer from the calling endpoint. The media tunneling answer can identify the selected port of the edge element.

Conducting the call session between the calling endpoint and the remote endpoint using the signaling channel and media tunneling can further comprise receiving, at the port of the edge element indicated by the media tunneling answer from the calling endpoint, an initial media packet of the multiplexed media streams. The initial media packet using the unique stream identifier. A source port for the calling endpoint can be identified based on the received initial media packet and the unique stream identifier. The identified source port for the calling endpoint can be mapped to a destination associated with the remote endpoint.

Conducting the call session between the calling endpoint and the remote endpoint using the signaling channel and media tunneling can further comprise receiving, at the port of the edge element indicated by the media tunneling answer from the calling endpoint, subsequent media packets of the multiplexed media streams. Each subsequent media packet can use the unique stream identifier. The media packets of the multiplexed media streams can be demultiplexed based on the unique stream identifier and the demultiplexed media packets can be provided to the remote endpoint based on the mapping of the identified source port for the calling endpoint to the destination associated with the remote endpoint.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

Figure 1:
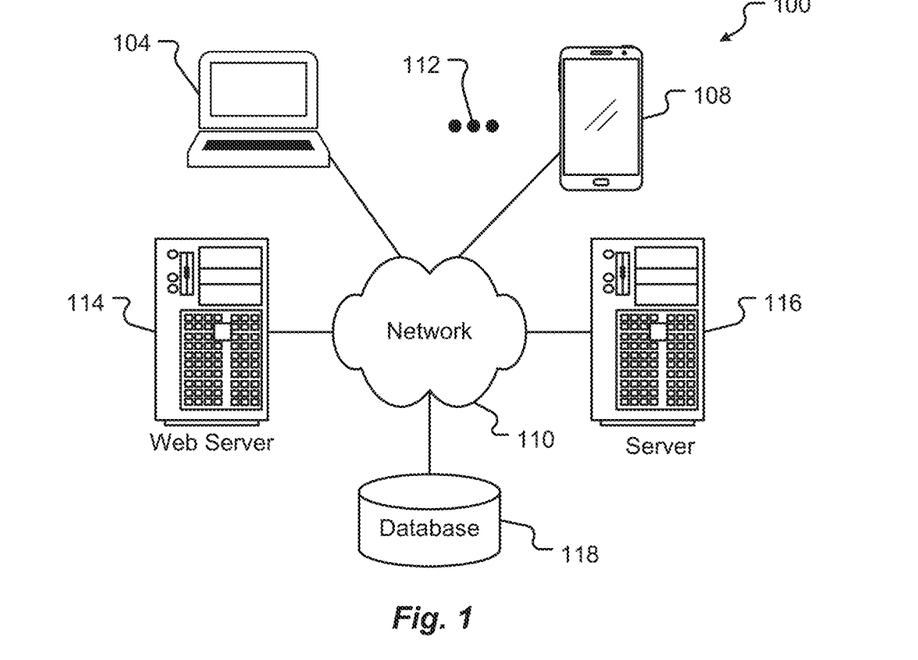
FIG. 1 is a block diagram illustrating elements of an exemplary computing environment in which embodiments of the present disclosure may be implemented.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation SIP, TCP/IP, SNA, IPX, AppleTalk, and the like. Merely by way of example, the network 110 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP (Session Initiation Protocol) servers, HTTP(s) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a storage-area network ("SAN") familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to SQL-formatted commands.

Figure 2:
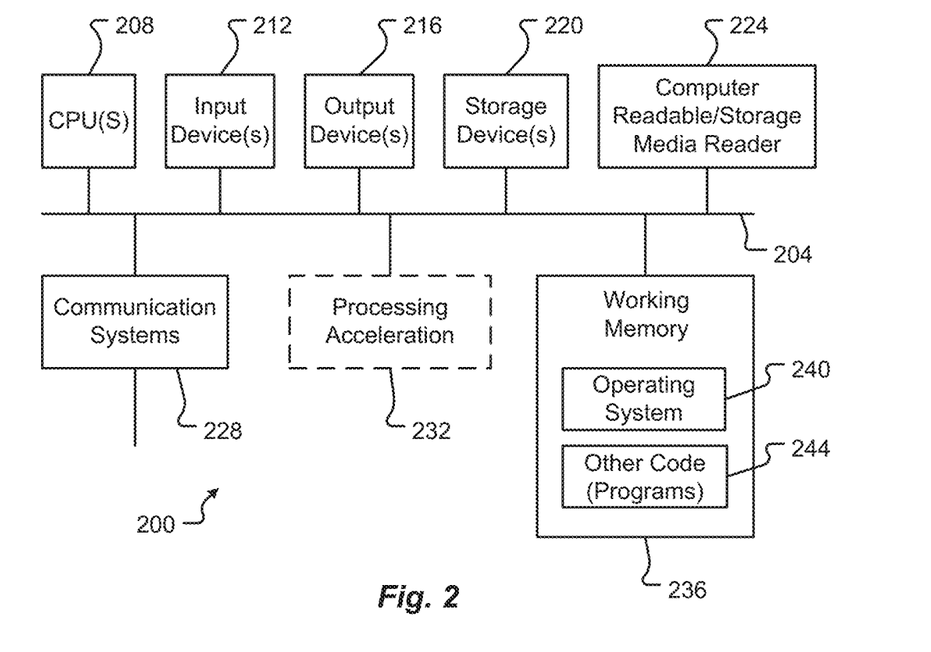
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more central processing units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a random access memory ("RAM") and/or a read-only memory ("ROM"), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a DSP, a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
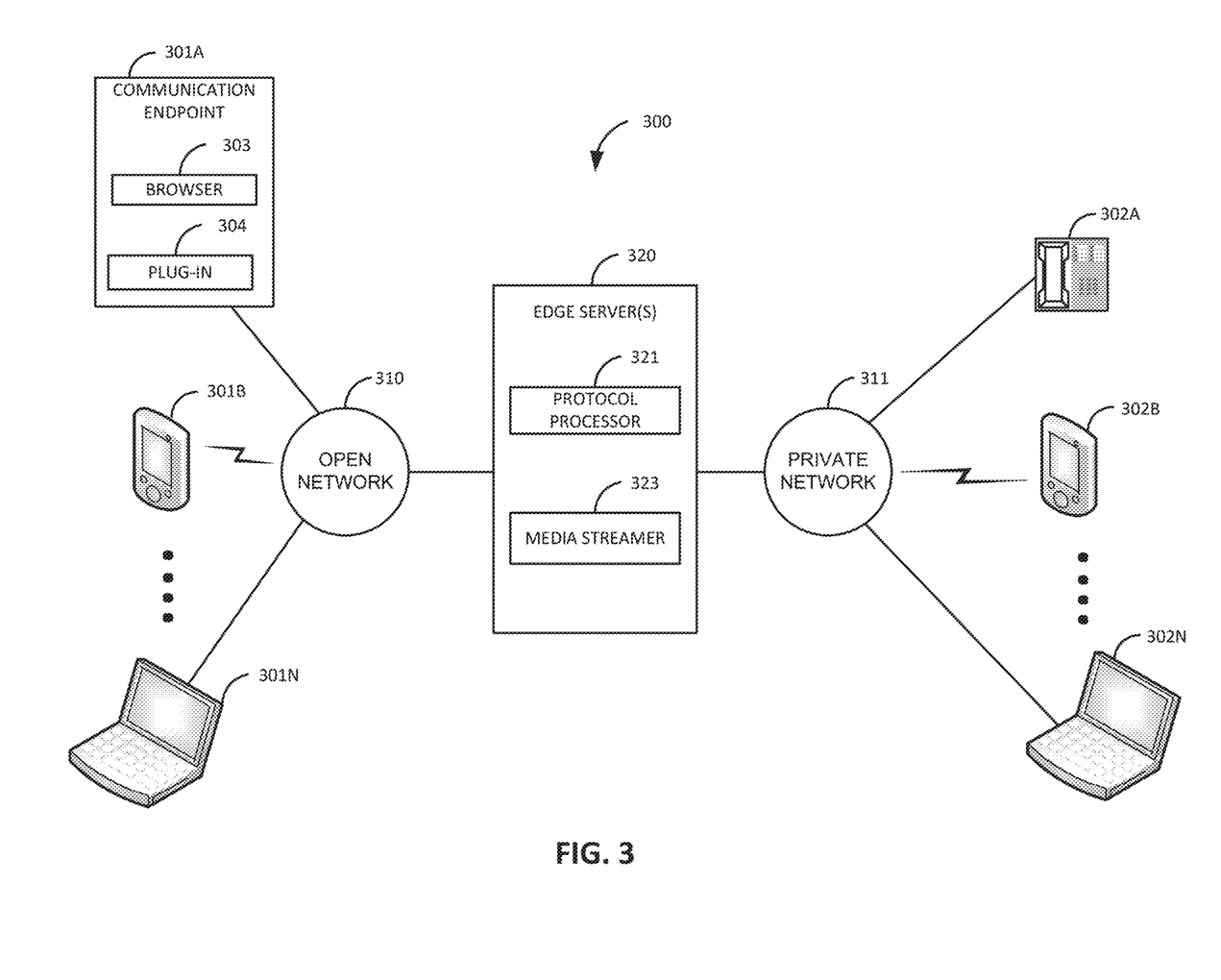
FIG. 3 is a block diagram illustrating a system for exchanging media across communication networks according to one embodiment.

FIG. 3 is a block diagram illustrating a system for exchanging media across communication networks according to one embodiment. As illustrated in this example, the system 300 can comprises communication endpoints 301A-301N on an open network 310 such as the Internet and communication endpoints 302A-302N on a private network 311 such as an enterprise network. One or more edge servers 320 can be communicatively coupled with both the open network 310 and private network 311.

The communication endpoints 301A-301N on the open network 310 can be or may include any communication endpoint that can communicate on the open network 310, such as a Personal Computer (PC), a telephone, a video system, a cellular telephone, a Personal Digital Assistant (PDA), a tablet device, a notebook device, a smart phone, and/or the like. As shown in FIG. 3, any number of communication endpoints 301A-301N may be connected to the open network 310, including only a single communication endpoint.

The communication endpoints 301A-301N may, in some cases, further comprise a browser 303. The browser 303 can be or may include any software that can browse the network 310, such as Firefox®, Internet Explorer®, Google Chrome®, Opera®, Safari®, and/or the like. The browser 303 may communicate on the open network 310 using protocols, such as HTTP and WebRTC.

One or more communication endpoints, such as endpoint 301A, can further comprise a browser plug-in 304. The browser plug-in 304 can be any browser plug-in that can provide additional features to the browser 303. Although the communication endpoints 301B-301N do not show the browser 303 or browser plug-in 304, some or all of these communication endpoints 301B-301N may also have the browser 303 and browser plug-in 304 as appropriate.

The communication endpoints 302A-302N on the private network 311 can be or may include any communication endpoint that can communicate on the private network 311, such as a Personal Computer (PC), a telephone, a video system, a cellular telephone, a Personal Digital Assistant (PDA), a tablet device, a notebook device, a smart phone, and/or the like. As shown in FIG. 3, any number of communication endpoints 302A-302N may be connected to the network 311, including only a single communication endpoint 302. While not shown here, it should be understood that endpoints 302A-302N may also comprise a browser and browser plug-in as appropriate.

The networks 310 and 311 can be or may include any collection of communication equipment that can send and receive electronic information, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The networks 310 and 311 can use a variety of protocols, such as Ethernet, Internet Protocol (IP), Session Initiation Protocol (SIP), Integrated Services Digital Network (ISDN), HTTP, WebRTC, JSON-RPC, and the like. In one embodiment, the open network 310 may be the Internet and the private network 311 may be a corporate or enterprise network.

The edge servers 320 can be or may include any hardware/software that can manage protocol conversion between the open network 310 and the private network 311. Generally speaking, the one or more edge servers 320 can further comprise a protocol processor 321 and/or a media streamer 323. The protocol processor 321 can be or may include any hardware/software that can process protocols, such as, WebRTC, JSON-RPC, SIP, BFCP, and/or the like. The media streamer 323 can be or may include any hardware/software that can be used to stream media in a conference call. The media streamer 323 can be controlled by a specific participant in the conference call. The media streamer 323 can be used to determine who can receive the media stream.

As noted above, embodiments of the disclosure provide systems and methods for exchanging media through the one or more edge server(s) 320 between the open network 310 and private network 311. More specifically, embodiments of the present disclosure provide systems and methods for establishing and conducting voice and/or video communications between one or endpoints 302A-302N on the private network and one or more endpoints 301A-301N on the open network 310 or on a different enterprise network (not shown here). Two external endpoints may use media tunneling techniques described herein and supported by the edge server(s) 320 to set up a successful call/media path. In this case, the edge server(s) 320 can be viewed as hair pinning the media path between two endpoints that cannot directly exchange media traffic. As will be described in greater detail below, the edge server(s) 320 can be adapted to allow media packets to traverse through a port typically kept open by enterprise firewalls and used for other data exchanges such as HyperText Transfer Protocol (HTTP) data traffic.

In many cases, a SIP call or a HTTP-based client SDK call from another enterprise or public network traverses across multiple firewalls (not shown here). However, the firewalls will not have the media ports on UDP open and media packets will be blocked. According to embodiments described herein, media packets can traverse through a well-known HTTPS port, e.g., port 443, on the firewall which is kept open on the firewalls for http browsing. The edge server 320 can multiplex media streams towards the public or open network 310 on TLS/443 and demultiplex the streams towards the enterprise or private network 311 into different streams for multiple calls based on fingerprints derived from certificates. However, man in the middle proxies can generate certificates of their own making multiplexing and demultiplexing of tunneled media through TLS/443 based on fingerprints derived from certificate redundant. Accordingly, and as will be described in greater detail below, tunneling media on TCP/TLS through 443 port and multiplex and demultiplex at the edge server 320 can be based on a unique stream identifier rather than an exchange of certificates. According to one embodiment, this identifier can be generated by the calling device, for example, based on a certificate securely maintained by that device.

In some cases, media exchanges may traverse a highly secured two-tier demilitarized zone (DMZ) or a secured communication link between a branch and a data center or a cloud provider. The firewall inside the DMZ or the far-end branch firewall may have only one port open for security reasons as in a multi-tier DMZ or manageability as in case of a far-end branch. Embodiments described herein provide for tunneling the media through this open port as UDP or TCP. In this way, the data can be compressed and can save bandwidth when multiplexed on this link.

Figure 4:
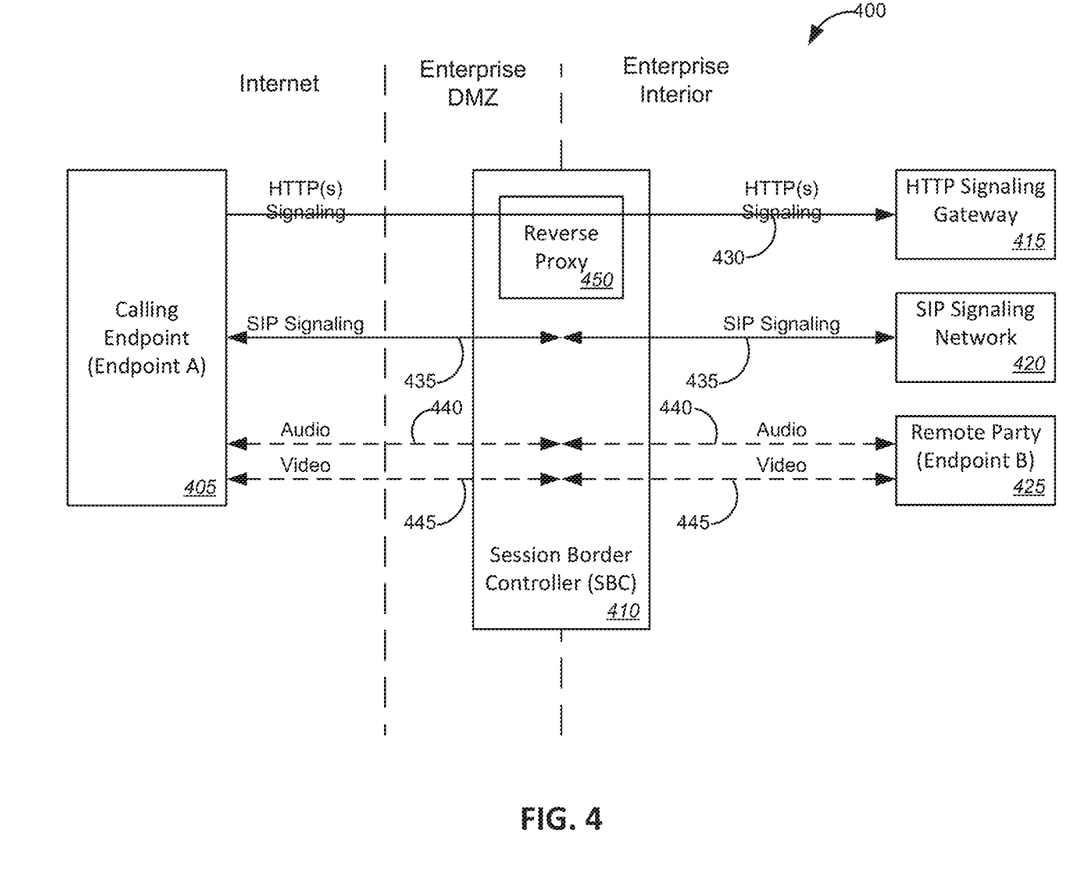
FIG. 4 is a block diagram illustrating additional details of a system for media tunneling through an edge server and exchanging media across communication networks according to one embodiment.

FIG. 4 is a block diagram illustrating additional details of a system for media tunneling through an edge server and exchanging media across communication networks according to one embodiment. As illustrated in this example, the system 400 can comprise a calling endpoint, such as any of the endpoints 301A-301N described above. The calling endpoint can be communicatively coupled via the Internet or other open network (not shown here) such as described above with a Session Border Controller (SBC) 410 such as one or more of the edge servers also as described above. The SBC 410 can also be communicatively coupled with a private network (not shown here) such as an enterprise network as described above. Through the private network, the SBC can communicate with a HyperText Transfer Protocol (HTTP) signaling gateway 415, a Session Initiation Protocol (SIP) signaling network, and a remote endpoint 425 such as any of the endpoints 302A-302N described above.

Generally speaking, embodiments of the present disclosure provide systems and methods for establishing and conducting voice and/or video communications between the calling endpoint 405 and the remote endpoint 425. For example, the calling endpoint 405 may call or otherwise attempt to contact the remote endpoint to establish a voice call, video call, voice and/or video conference, or other communication session in which audio and/or video media will be exchanged. As will be described in greater detail below, the SBC 410 can be adapted to allow media packets, i.e., the audio and/or video streams of the session, to traverse through a port typically kept open by enterprise firewalls and used for other data exchanges such as HyperText Transfer Protocol (HTTP) data traffic.

More specifically, exchanging media between the calling endpoint 405 and the remote endpoint 425 can begin with the calling endpoint 405 sending a message requesting call initiation. For example, the external, calling endpoint 405 can send a signaling message requesting call setup such as a SIP INVITE message via a SIP signaling channel 435 to the SIP signaling network 420 or an HTTP-based message via an HTTP signaling channel to the HTTP signaling gateway. The call setup signaling can include the calling endpoint's 405 media capabilities captured in a Session Description Protocol (SDP) message carried in the call set up message (e.g., in the SIP INVITE request). According to one embodiment, the SDP message can include the calling endpoint's 405 local IP address, list of codecs the calling endpoint 405 prefers to use for an audio channel 440 and video channel 445, audio and video port numbers that are used to send/receive audio and video RTP packets/respectively.

The SBC 410 can receive, from the calling endpoint 405, the message requesting initiation of the call between the calling endpoint 405 and the remote endpoint 425 and determining whether the call has been accepted by the remote endpoint 425. If the call set up request is not accepted by the remote endpoint 425, the call can fail. In response to determining the call has been accepted by the remote endpoint 425, the SBC 410 can send a response to the calling endpoint 405 indicating acceptance of the call. For example, if the call set up request is accepted by the remote endpoint 425, a SIP 200 OK response via the SIP signaling channel 435 (or an HTTP message via the HTTP signaling channel 430) carrying the remote endpoint's 425 SDP media capabilities can be returned to the calling endpoint 405 from the SBC 410. This information returned to the calling endpoint 405 can include the remote endpoint's 425 media address, ports (audio and video), audio and video codecs, etc.

The calling endpoint 405 can receive the response from the SBC 410 and, still during initiation of the call session with the remote endpoint 425, send a message to the remote endpoint 425 to check media connectivity in the call session. For example, the calling endpoint 405 can send a STUN message over audio channel 440 or video channel 445, to make sure that UDP based RTP audio and video packets can be exchanged with the remote endpoint 425. According to one embodiment, UDP-based media exchange can be considered the default way of exchanging media over TLS-based media exchange and TLS-based media exchange can be used when UDP based media is unavailable or not supported due to firewall or other restrictions imposed between the calling endpoint 405 and the remote endpoint 425.

The SBC 410 can receive the message to check media connectivity in the call session from the calling endpoint 405 and determine, based on the message from the calling endpoint 405, whether media connectivity is available between the calling endpoint 405 and the remote endpoint 425. In response to determining media connectivity is available between the calling endpoint 405 and the remote endpoint 425, the endpoints 405 and 425 and SBC 410 can conduct the call session between the calling endpoint 405 and the remote endpoint 425 using the signaling channel 430 or 435 without media tunneling. For example, if the STUN connectivity check passes, then the audio and video packets can be carried over UDP and no TLS based media tunneling is done. In response to determining media connectivity is not available between the calling endpoint 405 and the remote endpoint 425, the endpoints 405 and 425 and SBC 410 can conduct the call session between the calling endpoint 405 and the remote endpoint 410 using the signaling channel 430 and 435 and media tunneling. For example, if the STUN connectivity check fails, the calling endpoint 405 can initiate a media tunneling through a designated port. This port can be, for example, HTTPS port 443 which can be open in the firewalls. Tunneling as described herein can use TCP on port 443 to utilize a firewall pinhole for network traversal. For additional security, this can be embedded in a TLS connection.

Media tunneling can begin with the calling endpoint 405 generating a media tunneling offer. The calling endpoint 405 can initiate this new offer with TCP SRTP or TLS SRTP transport on each media line 440 and 445 for example for audio, video (people) and video (content) instead of UDP RTP. Each of the media streams can be identified by a unique stream identifier. According to one embodiment, the unique stream identifier can be derived from a certificate installed on the calling endpoint.

The SBC 410 can receive the media tunneling offer from the calling endpoint 405 and generate a media tunneling answer identifying the selected port of the session border controller through which tunneling will be performed. This answer can be sent to the calling endpoint 405 in response to the media tunneling offer from the calling endpoint. For example, the SBC 410 can answer back with TCP SRTP or TLS SRTP port 443 in SDP. The SBC 410 need not send the unique stream identifier back to the calling endpoint 405.

The calling endpoint 405 can then send and initial packet on TCP or TLS using the to the SBC 405 from its media source port. This initial packet can use the unique stream identifier originally sent to the SBC 405 in the media tunneling offer from the calling endpoint 405. The SBC 410 can identify the calling endpoint's 405 unique media source port per stream based on the stream identifier in the TCP packet. Using the unique stream identifier and media source port of the calling endpoint 405, the SBC 410 can maintain a source—destination map and demultiplex streams to the destination over UDP towards the endpoint 425 or media server.

Once this identification has been done, the calling endpoint 405 can send and the SBC 410 can receive subsequent media packets of the multiplexed media streams. Each subsequent media packet can also use the unique stream identifier. The media packets of the multiplexed media streams can be demultiplexed by the SBC based on the unique stream identifier and the demultiplexed media packets can be provided to the remote endpoint based on the mapping of the identified source port for the calling endpoint to the destination associated with the remote endpoint.

In this way, media streams coming from multiple calling endpoints on the SBC's port 443 and the same NATed far end address, behind which all such clients resides, can be differentiated using the unique stream identifier exchanged by the clients in the tunneling offer. The stream identifier per client per stream can then be exchanged in the initial packet to identify the media source and the SBC 410 can maintain this map throughout the session between outbound and inbound media streams. Thus, any media stream arriving on the public side can be identified by the unique stream identifier and can be relayed to the corresponding media stream towards the enterprise side and vice versa.

In case of a multi-tier DMZ (not shown here), media packets can be multiplexed through one secure channel using embodiments such as described and the firewall in front of the second DMZ can allow media packets to traverse through one port opened on the firewall. A back-to-back SBC can be used on both sides of this multi-tier DMZ. The offering SBC can provide unique stream identifiers for media streams associated in SIP sessions based on the SIP Offer/Answer exchange. The answering SBC can also provide stream identifiers for each media stream. The media packets will be tagged with the unique stream identifiers and the SBC can demultiplex the streams based on stream identifier tag and send to multiple destinations. The SBC can also multiplex the media streams on one media channel by multiplexing the streams and adding a unique stream identifier tag for each media packet. This same approach can be used for a border controller from a branch to another peer border controller on a cloud edge or data center on a WAN. This can also save bandwidth on the WAN by sending media streams on one channel apart from security.

Figure 5:
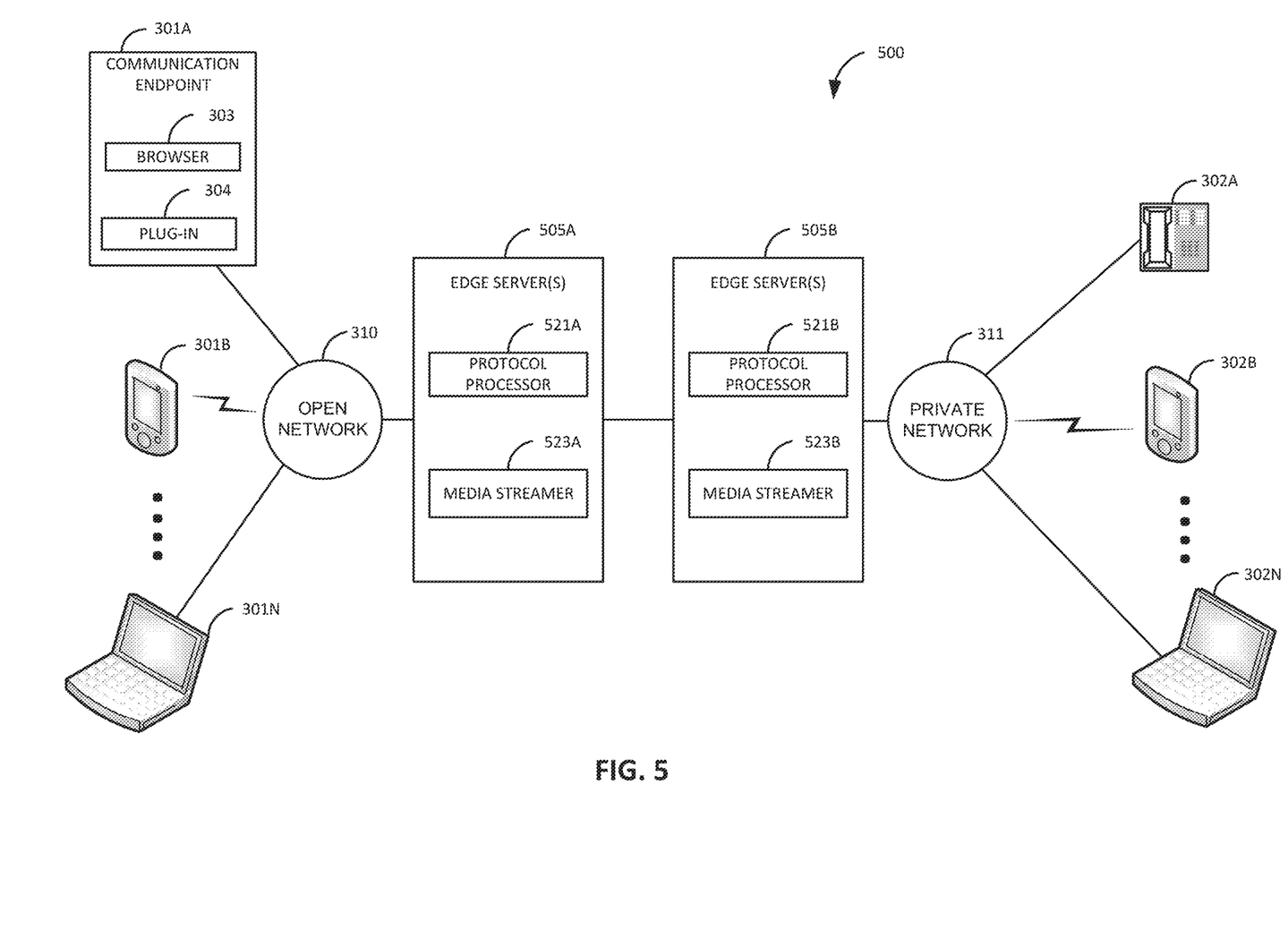
FIG. 5 is a block diagram illustrating a system for exchanging media across communication networks according to an alternative embodiment.

FIG. 5 is a block diagram illustrating a system for exchanging media across communication networks according to an alternative embodiment. More specifically, this example illustrates an implementation in which a stream identifier as described herein can be used to multiplex streams between two edge servers, such as edge servers 505A and 505B. As illustrated here, one edge server 505A can operate on an edge of a public cloud or open network 310 as described above and the other edge server 505B can operate at an edge of a private network 311 as described above.

The edge servers 505A and 505B, as described above, can be or may include any hardware/software that can manage protocol conversion between the open network 310 and the private network 311 respectively. Generally speaking, the edge servers 505A and 505B can each comprise a protocol processor 521A and 521B and/or a media streamer 523A and 523B as described above. The media streamer 323 can be or may include any hardware/software that can be used to stream media in a conference call according to embodiments described herein. More specifically, media streams of conferences or other communication sessions crossing between the networks 310 and 311 can be multiplex into a single stream for exchange between edge servers 505A and 505B with the individual streams identified by a unique stream identifier as described herein.

More specifically, the private network 311 may comprise a highly secure, multi-tier DMZ including a firewall (not shown here). The firewall inside the DMZ or the far end branch firewall may have only one port open for security reasons as in multitier DMZ or manageability as in case of far end branch. According to one embodiment, the edge element 505B on the private network 311 and another edge element 505A on a public network 310 can conduct media streaming and provide security though one pipe or port instead of the firewall on the private network 311 having to open many ports. To do so, the initial signaling exchange, e.g., SIP signaling, can send a unique stream identifier, e.g., in an SDP offer. In some cases, this may also be identified as a unique channel identifier in case of Traversal Using Relays around NAT (TURN) protocol control messages between two turn servers residing at both the edges, multiplexing WebRTC traffic though a TURN relay port. In general, any control signaling protocol may use a signaling element uniquely identified by the unique stream identifier. The media streams, such as RTP streams, through this one port pipe can be multiplexed such that each RTP packet is tagged with this unique stream identifier at the edge element 505A of the public network 310. In the case of a TURN relay between two turn servers residing at both the edges, each TURN media packet may also be identified using the unique channel identifier. In general, the media packets may be multiplexed over one media stream using the unique identifier signaled in the signaling control message between two edge elements. Apart from security, since all media packets are sent over one pipe, bandwidth is conserved and can be further compressed using other algorithms as known in the art.

Stated another way, a system 500 can comprise a first communication network 310 and a second communication network 311. The first communication network 310 can comprise a public network and the second communication network 311 can comprise a private network. A first edge element 505A can be coupled with the first communication network 310 and a second edge element 505B can be coupled with the second communication network 311 and the first edge element 505A. The second communication network 311 can further comprise a firewall and the second edge element 505B can comprise an element of a multi-tier DMZ of the second communication network 311.

During initiation of a call session between a calling endpoint 301B on the first communication network 310 and a remote endpoint 302A on the second communication network 311, the second edge element 505B can receive a control signaling protocol session initiation message from the first edge element 505A including a unique stream identifier. In some cases, for example, the session initiation message from the first edge element including the unique stream identifier can comprise a Session Description Protocol (SDP) offer message. The second edge element 505B can generate and send a response message to the session initiation message. The response message can identify a selected port of the second edge element 505B. The call session between the calling endpoint 301B and the remote endpoint 302A can be conducted using tunneling of multiplexed media streams through the selected port of the second edge element 505B. Each of the multiplexed media streams can be identified by the unique stream identifier. The call session can be conducted between the calling endpoint 301B and the remote endpoint 302A using tunneling of multiplexed media streams through the selected port of the second edge element 505B instead of through a port of the firewall. The media packets of the multiplexed media streams can be multiplexed over one media stream and can be identified with the unique stream identifier. In some cases, for example, the multiplexed media streams can comprise Realtime Transport Protocol (RTP) media streams and each packet of each RTP media stream can be identified with the unique stream identifier. According to one embodiment, the multiplexed media streams can also be compressed to save bandwidth.

Figure 6:
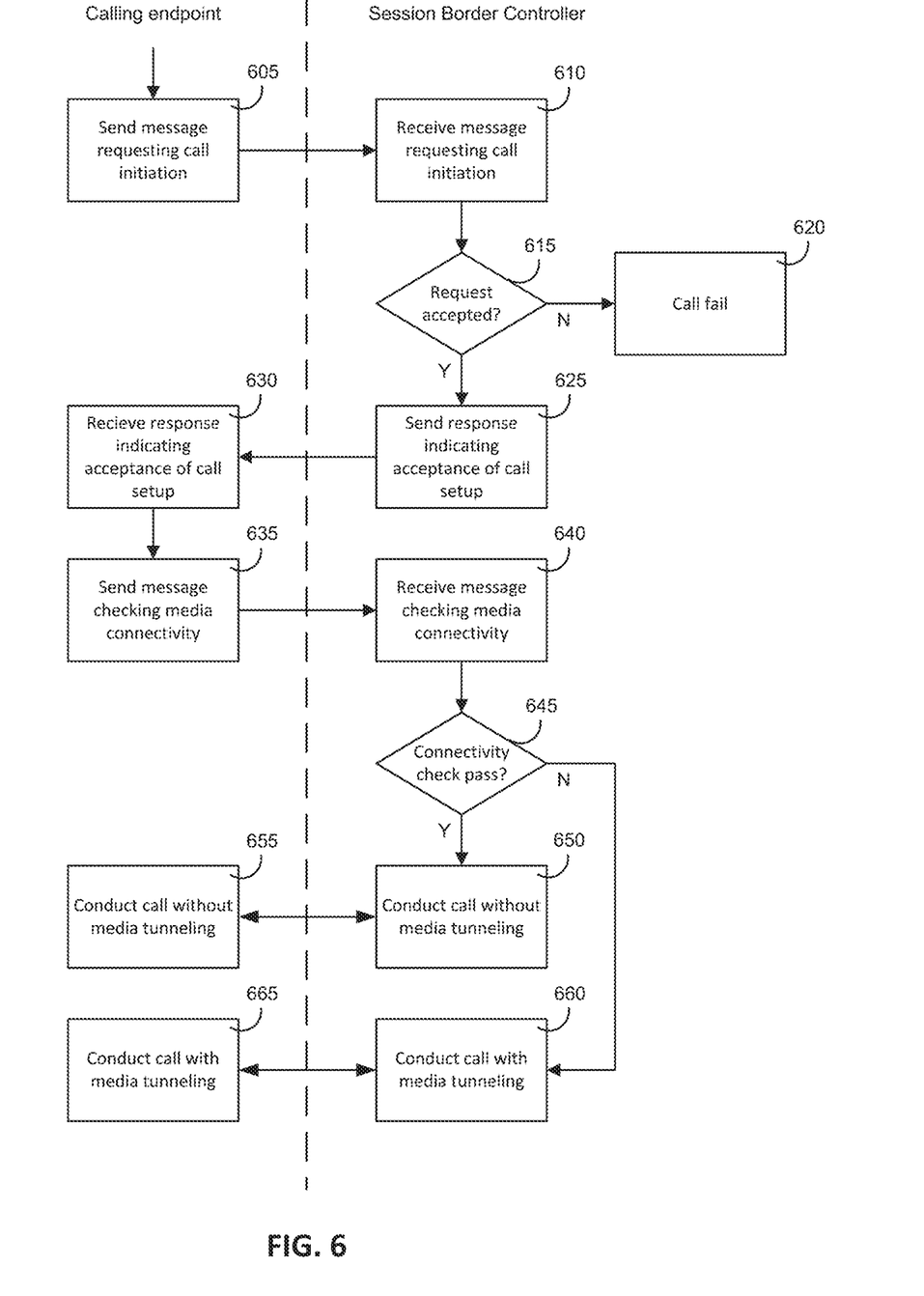
FIG. 6 is a flowchart illustrating an exemplary process for exchanging media across communication networks according to one embodiment.

FIG. 6 is a flowchart illustrating an exemplary process for exchanging media across communication networks according to one embodiment. As illustrated in this example, exchanging media can begin with the calling endpoint sending 605 a message requesting call initiation. For example, the external, calling endpoint can send 605 a signaling message such as a SIP INVITE message or an HTTP-based message requesting call setup. The call setup signaling can include the calling endpoint's media capabilities captured in a Session Description Protocol (SDP) message carried in the call set up message (e.g., in the SIP INVITE request). According to one embodiment, the SDP message can include the calling endpoint's local IP address, list of codecs the calling endpoint prefers to use for audio and video channels, audio and video port numbers that are used to send/receive audio and video RTP packets, respectively.

The SBC can receive 610, from the calling endpoint, the message requesting initiation of the call between the calling endpoint and the remote endpoint and determining 615 whether the call has been accepted by the remote endpoint. If 615 the call set up request is not accepted by the remote endpoint, the call can fail 620. In response to determining 615 the call has been accepted by the remote endpoint, the SBC can send 625 a response to the calling endpoint indicating acceptance of the call. For example, if 615 the call set up request is accepted by the remote endpoint, a SIP 200 OK response (or an HTTP message) carrying the remote endpoint's SDP media capabilities can be returned to the calling endpoint from the SBC. This information returned to the calling endpoint can include the remote endpoint's media address, ports (audio and video), audio and video codecs, etc.

The calling endpoint can receive 630 the response from the SBC and, still during initiation of the call session with the remote endpoint on the second communication network, send 635 a message to the remote endpoint using a signaling channel to check media connectivity in the call session. For example, the calling endpoint can send 635 a STUN message over audio and video channels, to make sure that UDP based RTP audio and video packets can be exchanged with the remote endpoint. According to one embodiment, UDP-based media exchange can be considered the default way of exchanging media over TLS based media exchange and TLS-based media exchange can be used when UDP based media is unavailable or not supported due to firewall or other restrictions imposed between the calling endpoint and the remote endpoint.

The SBC can receive 640 the message to check media connectivity in the call session from the calling endpoint and determine 645, based on the message from the calling endpoint, whether media connectivity is available between the calling endpoint and the remote endpoint. In response to determining 645 media connectivity is available between the calling endpoint and the remote endpoint, the endpoints and SBC can conduct 650 and 655 the call session between the calling endpoint and the remote endpoint using the signaling channel without media tunneling. For example, if the STUN connectivity check passes, then the audio and video packets can be carried over UDP and no TLS based media tunneling is done. In response to determining 645 media connectivity is not available between the calling endpoint and the remote endpoint, the endpoints and SBC can conduct 660 and 665 the call session between the calling endpoint and the remote endpoint using the signaling channel and media tunneling. For example, if the STUN connectivity check fails, the calling endpoint can initiate a media tunneling based negotiation. Additional details of initiating and conducting media tunneling according to one embodiment will now be described with reference to FIG. 6.

Figure 7:
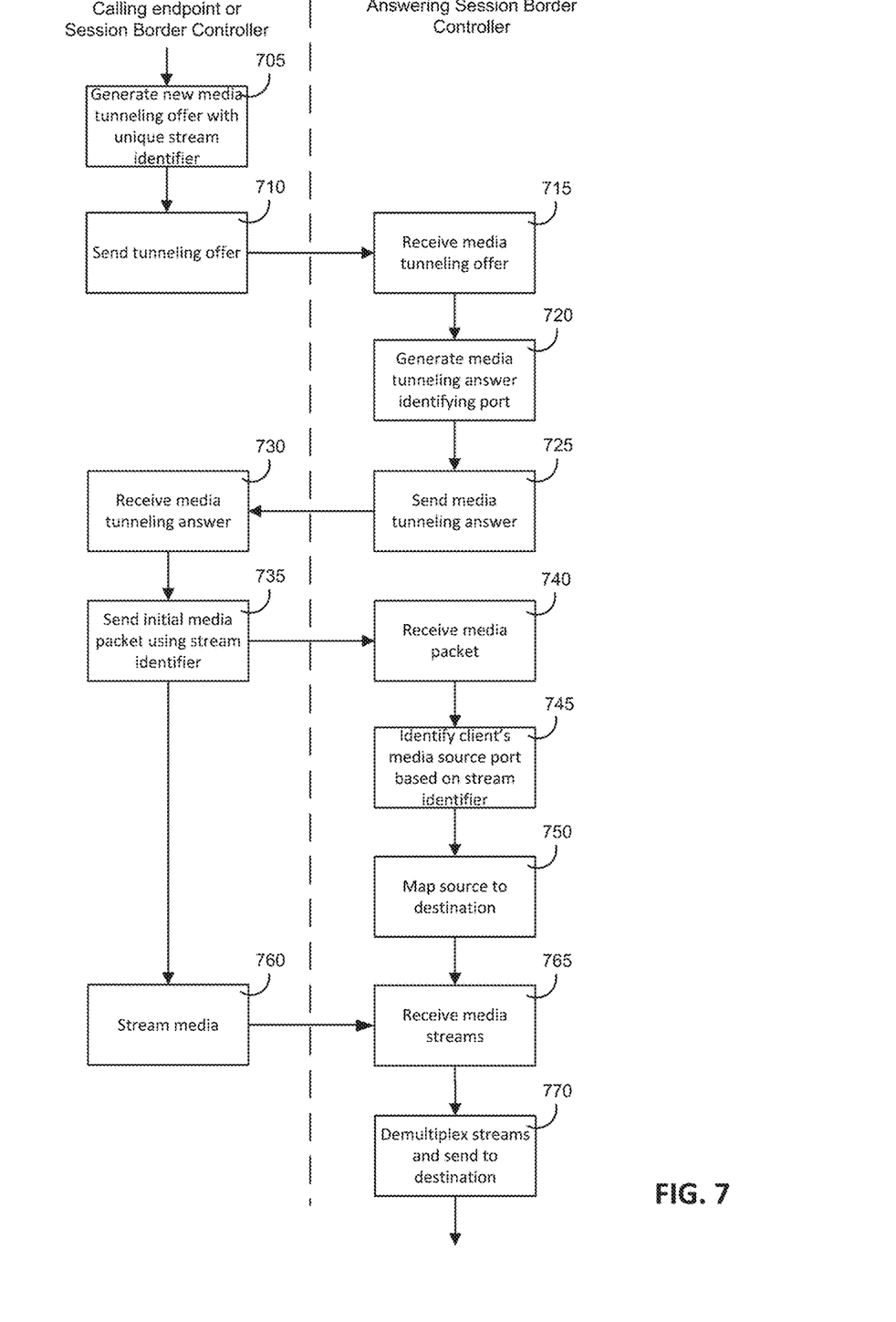
FIG. 7 is a flowchart illustrating additional details of an exemplary process for media tunneling according to one embodiment.

FIG. 7 is a flowchart illustrating additional details of an exemplary process for media tunneling according to one embodiment. As illustrated in this example, media tunneling can begin with the calling endpoint or initiating SBC, generating 705 a new media tunneling offer. This offer message can include a unique stream identifier for the media streams to be exchanged with the calling endpoint. According to one embodiment, the unique stream identifier can be derived from a certificate installed on the calling endpoint. The calling endpoint or SBC can then send 710 the offer message to the answering SBC.

The answering SBC can receive the media tunneling offer from the calling endpoint and generate 715 a media tunneling answer in response to the media tunneling offer from the calling endpoint. According to one embodiment, the media tunneling answer can identify the selected port of the session border controller, i.e., the port through which media streams can be tunneled. The SBC can then send 725 the media tunneling answer to the calling endpoint.

The calling endpoint can receive 730 the media tunneling answer and begin streaming media. Specifically, the calling endpoint can send 735 an initial media packet of a multiplexed media stream. The initial media pack can use the unique stream identifier originally sent in the media tunneling offer.

The SBC can receive 740, at the port of the session border controller indicated by the media tunneling answer from the calling endpoint, the initial media packet of the multiplexed media streams. A source port for the calling endpoint can be identified 745 based on the received initial media packet and the unique stream identifier. The identified source port for the calling endpoint can then be mapped 750 to a destination associated with the remote endpoint. The calling endpoint can then send 760 and the SBC can receive 765 at the port of the session border controller indicated by the media tunneling answer from the calling endpoint, subsequent media packets of the multiplexed media streams. Each of the subsequent media packet can use the same unique stream identifier initially provided by the calling endpoint. The SBC can then demultiplex 770 the media packets of the multiplexed media streams based on the unique stream identifier and provide the demultiplexed media packets to the remote endpoint based on the mapping of the identified source port for the calling endpoint to the destination associated with the remote endpoint.

It should be noted that, while the figures and accompanying description of each illustrate and describe the external endpoint initiating a call, the same media tunneling approach can be applied whether the external endpoint is the initiator of the call, or the receiver of the call. It should also be noted that it is possible for both caller and called endpoints to be on the external network. In this case, the SBC can provide media tunneling support to allow exchange of media between two external endpoints, which would otherwise have not been possible.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a first communication network;
a second communication network; and
an edge element coupled with the first communication network and the second communication network, the edge element comprising a processor and a memory, the memory comprising a set of instruction stored therein which, when executed by the processor, causes the processor to:
receive, during initiation of a call session between a calling endpoint on the first communication network and a remote endpoint on the second communication network, a message to the remote endpoint to check media connectivity in the call session; and
determine that media connectivity is not available between the calling endpoint and the remote endpoint, the determination that media connectivity is not available comprising:
receive a media tunneling offer, the media tunneling offer including a unique stream identifier to identify multiplexed media streams to be exchanged;
generate and send a media tunneling answer, the media tunneling answer identifying a selected port of the edge element;
receive, at the selected port of the edge element, an initial media packet using the unique stream identifier, wherein the initial media packet comprises media data, and wherein the unique stream identifier is used in subsequent media packets;
identify a source port for the calling endpoint based on the initial media packet and the unique stream identifier; and
map the identified source port to a destination associated with the remote endpoint.

2. The system of claim 1, wherein the unique stream identifier is generated based on a certificate installed on the calling endpoint.

3. The system of claim 1, further comprising:
receiving, at the selected port of the edge element indicated by the media tunneling answer, the subsequent media packets of the multiplexed media streams, each subsequent media packet using the unique stream identifier;
demultiplexing the subsequent media packets of the multiplexed media streams based on the unique stream identifier; and
providing demultiplexed media packets to the remote endpoint based on the mapping of the identified source port for the calling endpoint to the destination associated with the remote endpoint.

4. The system of claim 3, further comprising:
converting media exchanged between the calling endpoint and the remote endpoint over one or more media channels from a protocol of the first communication network to a protocol of the second communication network and from the protocol of the second communication network to the protocol of the first communication network.

5. The system of claim 4, wherein the one or more media channels comprise an audio channel, a video channel, or a data channel.

6. The system of claim 1, wherein the multiplexed media streams are compressed.

7. A method comprising:
receiving, by an edge element during initiation of a call session between a calling endpoint on a first communication network and a remote endpoint on a second communication network, a message to the remote endpoint to check media connectivity in the call session; and
determining that media connectivity is not available between the calling endpoint and the remote endpoint, the determining comprising:
receiving a media tunneling offer, the media tunneling offer including a unique stream identifier to identify multiplexed media streams to be exchanged;
generating and sending a media tunneling answer, the media tunneling answer identifying a selected port of the edge element;
receiving, at the selected port of the edge element, an initial media packet using the unique stream identifier, wherein the initial media packet comprises media data, and wherein the unique stream identifier is used in subsequent media packets;
identifying a source port for the calling endpoint based on the initial media packet and the unique stream identifier; and
mapping the identified source port to a destination associated with the remote endpoint.

8. The method of claim 7, wherein the unique stream identifier is generated based on a certificate installed on the calling endpoint.

9. The method of claim 7, further comprising:
receiving, by the edge element at the selected port, the subsequent media packets of the multiplexed media streams, each subsequent media packet using the unique stream identifier;
demultiplexing, by the edge element, the subsequent media packets of the multiplexed media streams based on the unique stream identifier; and
providing, by the edge element, demultiplexed media packets to the remote endpoint based on the mapping of the identified source port for the calling endpoint to the destination associated with the remote endpoint.

10. The method of claim 9, wherein conducting the call session further comprises converting, by the edge element, media exchanged between the calling endpoint and the remote endpoint over one or more media channels from a protocol of the first communication network to a protocol of the second communication network and from the protocol of the second communication network to the protocol of the first communication network.

11. The method of claim 10, wherein the one or more media channels comprise an audio channel and a video channel separate from the audio channel.

12. The method of claim 7, wherein the multiplexed media streams are compressed.

* * * * *

UNITED STATES PATENT AND TRADEMARK OFFICE
CERTIFICATE OF CORRECTION

PATENT NO. : 10,880,120 B2
APPLICATION NO. : 16/039585
DATED : December 29, 2020
INVENTOR(S) : Manish Chatterjee and Shobhit Mishra Page 1 of 1

It is certified that error appears in the above-identified patent and that said Letters Patent is hereby corrected as shown below:

In the Claims

At Column 18, Line 26, delete "instruction" and insert --instructions-- therein.

Signed and Sealed this
Ninth Day of March, 2021

Drew Hirshfeld
*Performing the Functions and Duties of the
Under Secretary of Commerce for Intellectual Property and
Director of the United States Patent and Trademark Office*